(12) United States Patent
Bulzacchelli et al.

(10) Patent No.: US 9,467,313 B2
(45) Date of Patent: *Oct. 11, 2016

(54) CONTINUOUS-TIME LINEAR EQUALIZER FOR HIGH-SPEED RECEIVING UNIT

(71) Applicant: International Business Machines Corporation, Armonk, NY (US)

(72) Inventors: John F. Bulzacchelli, Yorktown Heights, NY (US); Pier Andrea Francese, Rueschlikon (CH); Yong Liu, Yorktown Heights, NY (US); Thomas H. Toifl, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,533

(22) Filed: Jun. 22, 2015

(65) Prior Publication Data
US 2015/0312064 A1 Oct. 29, 2015

Related U.S. Application Data

(63) Continuation of application No. 14/669,225, filed on Mar. 26, 2015.

(30) Foreign Application Priority Data

Apr. 11, 2014 (GB) .................................. 1406525.4

(51) Int. Cl.
*H03H 7/30* (2006.01)
*H04L 25/03* (2006.01)
*H04B 1/12* (2006.01)

(52) U.S. Cl.
CPC ......... *H04L 25/03057* (2013.01); *H04B 1/123* (2013.01); *H04L 25/03063* (2013.01); *H04L 25/03885* (2013.01)

(58) Field of Classification Search
CPC ............ H04L 25/03878; H04L 27/01; H04L 25/0272; H04L 2025/03636; H04L 2025/03433; H04L 25/0292; H04L 25/03; H04L 25/03057; H04L 25/03063; H04B 3/14; H04B 10/69; H04B 1/123
USPC ............... 375/233, 232, 229, 257; 330/28 R; 370/419, 463
See application file for complete search history.

(56) References Cited

U.S. PATENT DOCUMENTS 9,288,085 B2 * 3/2016 Bulzacchelli ..... H04L 25/03057

OTHER PUBLICATIONS

J. Bulzacchelili, et al., "Continuous-Time Linear Equalizer for High-Speed Receiving Unit," U.S. Appl. No. 14/669,225, filed Mar. 26, 2015.

(Continued)

*Primary Examiner* — Rahel Guarino
(74) *Attorney, Agent, or Firm* — Cantor Colburn LLP; Keivan Razavi

(57) ABSTRACT

A continuous-time linear equalizer for use in a receiving unit of a high-speed data transmission system for receiving an input signal includes a signal line configured to provide an equalized output voltage, and an active peaking control unit, including a predetermined first number of active peaking transistors each coupled between the signal line and a power supply rail; a peaking resistor that couples gate terminals of each of the active peaking transistors to the signal line; and a first number of first setting switches each associated with each of the first number of active peaking transistors to activate a predetermined number of the first number of transistors according to first setting signals.

21 Claims, 15 Drawing Sheets

(56) References Cited

OTHER PUBLICATIONS

List of IBM Patents or Patent Applications Treated as Related; CH92014004US2, Date File: Jun. 22, 2015; pp. 1-2.

P. Andrea Francese, et al.,"Peaking Inductor Array for Peaking Control Unit of Transceiver," U.S. Appl. No. 14/816,435, filed Aug. 3, 2015.

* cited by examiner

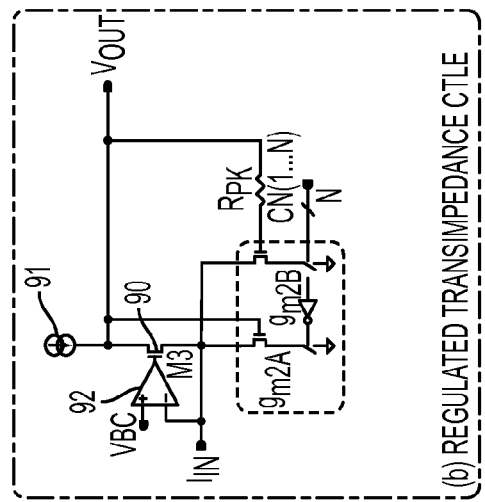
FIG. 6C (b) REGULATED TRANSIMPEDANCE CTLE
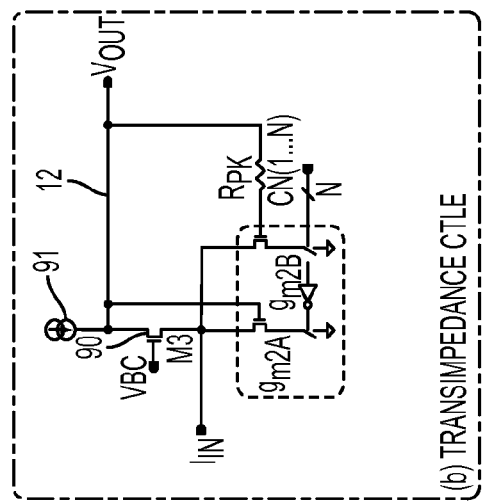
FIG. 6B (b) TRANSIMPEDANCE CTLE
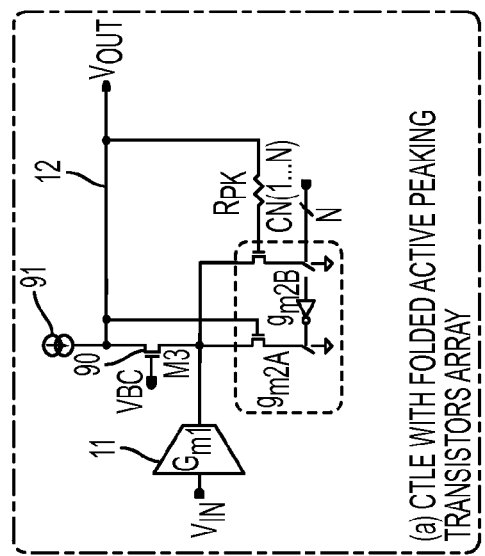
FIG. 6A (a) CTLE WITH FOLDED ACTIVE PEAKING TRANSISTORS ARRAY

CONTINUOUS-TIME LINEAR EQUALIZER FOR HIGH-SPEED RECEIVING UNIT

DOMESTIC AND FOREIGN PRIORITY

This application is a continuation of U.S. patent application Ser. No. 14/669,225, filed Mar. 26, 2015, which claims priority to Great Britain Patent Application No. 1406525.4, filed Apr. 11, 2014, and all the benefits accruing therefrom under 35 U.S.C. §119, the contents of which in its entirety are herein incorporated by reference.

BACKGROUND

The present invention relates to the field of equalization in high-speed receiving units, particularly to a continuous-time linear equalization in the analog regime. Furthermore, the present invention relates to a continuous-time linear equalizer suitable for the implementation in integrated circuitry, particularly in CMOS technology.

Data transceiving systems for high-speed communication are subject to signal distortion of the transmitted signal. Various measures are applied to reconstruct the transmitted data from the received analog signal. In receiving units, a number of equalizers are commonly provided to compensate for losses and signal distortion substantially caused by propagating the data signal via the transmission channel.

One known measure concerns an equalization of the received analog signal in the continuous time regime, i.e., before sampling and digitization and before the final digital processing of information is performed, by means of a continuous-time linear equalizer. The received analog signal to be processed by the continuous-time linear equalizer corresponds to a continuous voltage or current signal which is transmitted across the physical transmission channel according to a digital modulation format, e.g., to non-return-to-zero binary level signaling or to a pulse amplitude modulation with four signaling levels (PAM-4). It is the general purpose of a continuous-time linear equalization to compensate for the losses of high-frequency components of the transmitted analog signal which are caused by attenuation and dispersion of the signal propagating along the transmission channel.

Document US 2012/0201289 A1 discloses an exemplary continuous-time linear equalizer with three stages, wherein each stage consists of a differential pair with an NMOS active inductor load.

Document US 2013/0114663 A1 discloses a continuous-time linear equalizer circuit including a differential amplifier with two NMOS transistors, wherein the sources of the NMOS transistors are connected via a source resistor and a source capacitor. The source capacitor may be configured as a variable capacitor and the source resistor as a variable resistor to enable the adjustment of frequency and gain characteristics of the circuit for equalization purposes.

Document U.S. Pat. No. 8,537,886 B1 discloses an equalization structure with offset cancellation and bypass functions. In particular, an equalization architecture is disclosed that includes a continuous-time linear equalizer and a decision feedback equalizer each provided with offset cancellation that enables the equalizer to be used at high data rates.

Document US 2013/0188965 A1 discloses a continuous-time linear equalizer for an optical transceiver. The continuous-time linear equalizer implements a tunable high-pass function and attenuates the noise.

Document U.S. Pat. No. 8,335,249 B1 discloses an equalizer circuitry with three stages in series. Each stage includes a peaking inductor circuitry. Furthermore, the equalizer circuitry may include controllable, variable, static, DC mode offset voltage compensation and/or dynamic, continuous mode offset voltage compensation circuitry for respectively reducing a DC voltage offset and/or time-varying a continuous mode voltage offset between an output of the third equalizer stage and the utilization circuitry to which said output is applied. The first equalizer stage may be configured to have controllable variable impedance.

Document U.S. Pat. No. 8,274,326 B2 discloses a continuous-time linear equalizer with differential amplifiers, differential high-pass filters and current mirrors. The continuous-time linear equalizer may amplify the difference between two signals of a differential input signal using the differential amplifiers and other circuitry coupled thereto. In this manner, the continuous-time linear equalizer may actively compensate for channel losses that would otherwise occur at higher frequencies. Moreover, the equalizer may provide an amplifier gain factor that enables an equalization of the frequency response of a communication channel over any frequency range.

Document US 2008/0101450 A1 discloses a continuous-time linear equalizer with a differential amplifier stage followed by a stage with PMOS transistors, drains of which are coupled to the supply power and sources of which are coupled via a resistive element to the gate of the respective transistor. Furthermore, current sources are applied and may be controlled to provide offset correction in order to move a center of the data eye to a desired voltage.

SUMMARY

In one embodiment, a continuous-time linear equalizer for use in a receiving unit of a high-speed data transmission system for receiving an input signal includes a signal line configured to provide an equalized output voltage, and an active peaking control unit, including a predetermined first number of active peaking transistors each coupled between the signal line and a power supply rail; a peaking resistor that couples gate terminals of each of the active peaking transistors to the signal line; and a first number of first setting switches each associated with each of the first number of active peaking transistors to activate a predetermined number of the first number of transistors according to first setting signals.

BRIEF DESCRIPTION OF THE DRAWINGS

Embodiments are described in more detail in conjunction with the accompanying drawings in which:

FIGS. 6A, 6B and 6C show different configurations of an input circuitry of a continuous-time linear equalizer;

DETAILED DESCRIPTION

Figure 1:
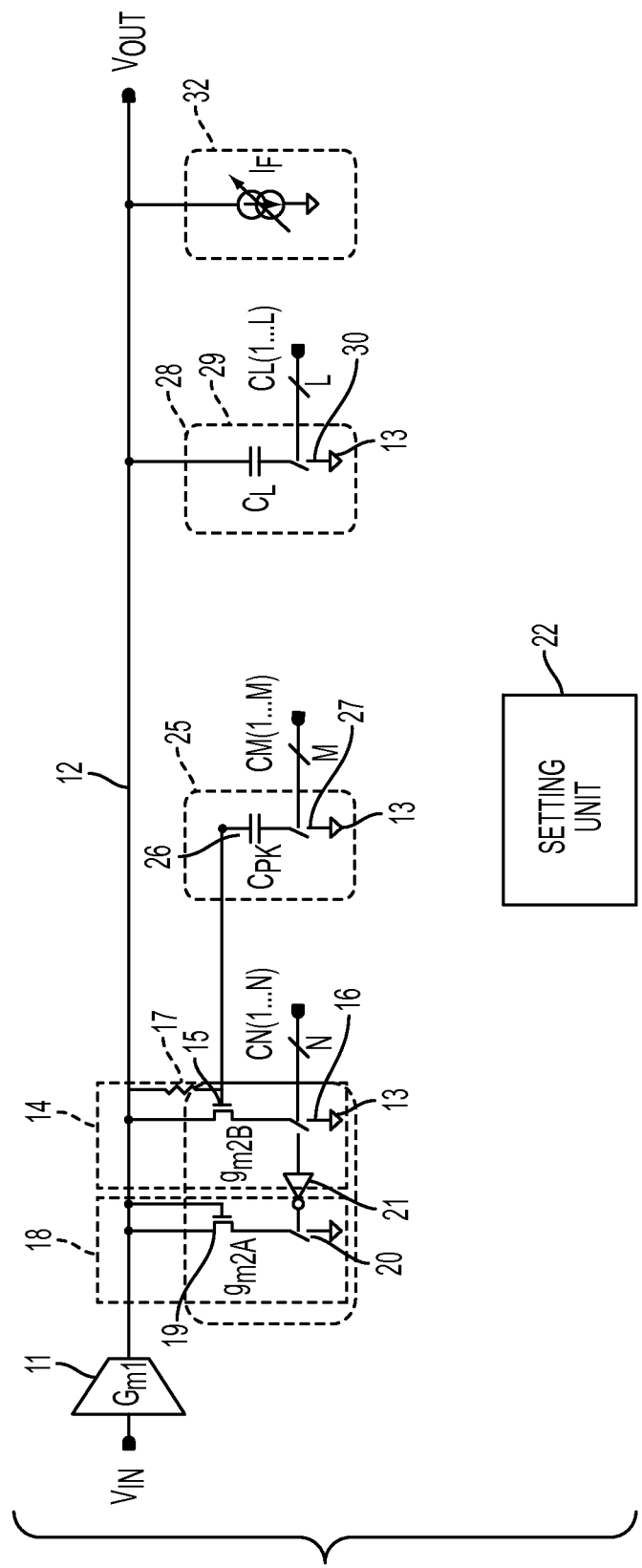
FIG. 1 schematically shows a continuous-time linear equalizer according to an embodiment.

Embodiments of the invention to provide continuous-time linear equalization with a peaking gain and bandwidth behavior which can be tuned separately while maintaining linearity. Embodiments of the invention also provide a continuous-time linear equalization with low power consumption.

One idea of the above embodied continuous-time linear equalizer is to use an array of active peaking, particularly MOS, transistors which can be selectively activated depending on the required characteristic of the receiving unit. Particularly, a programmable peaking requirement can be addressed. This may allow for setting up peaking behavior by means of the setting switches which are all connected to the power supply rail. This may enable to adapt the continuous-time linear equalizer for a high peaking at high frequencies with a low-voltage power supply, if implemented in CMOS technology.

According to embodiments, the peaking amount may be programmed in the frequency range of up to several 10 GHz using CMOS technology.

The continuous-time linear equalizer may further comprise a gain stage for coupling an input signal to the signal line for providing a predetermined or variable transconductance. The transfer function for the low-frequency gain can be controlled independently of the peaking by properly adjusting the gain of the gain stage. Particularly, it allows for setting up the transfer function independently of the peaking characteristics.

It may be provided that the continuous-time linear equalizer further comprises a number of serially coupled stages each comprising a gain stage and an active peaking control unit, wherein particularly the active peaking control units of two stages are coupled to a different potential of the power supply rail.

Moreover, the continuous-time linear equalizer may comprise a further peaking control unit having the first number of diode-connected transistors each coupled between the signal line and a power supply rail; and the first number of complementary first setting switches each associated to each of the first number of diode-connected transistors to activate a predetermined number of the first number of transistors according to inverted first setting signals, so that the total number of activated active peaking transistors and of the diode-connected transistors corresponds to the first number.

The number of activated diode-connected transistors and activated active peaking transistors is constant in order to maintain the same gain at low frequency (e.g., at DC).

According to an embodiment, the continuous-time linear equalizer may further comprise a peaking capacitor unit having a second number (plurality) of peaking capacitors each coupled between the gate-connected terminal of the peaking resistor and the power supply rail; and a second number of second setting switches each associated to each of the second number of peaking capacitors to activate a predetermined number of the second number of peaking capacitors according to second setting signals.

Furthermore, the continuous-time linear equalizer may further comprise a bandwidth control unit having: a third number (plurality) of load capacitors each coupled between the signal line and the power supply rail; and the third number of third setting switches each associated to each of the third number of load capacitors to activate a predetermined number of the third number of load capacitors according to third setting signals.

Moreover, the continuous-time linear equalizer may further comprise a current source unit which is configured as a predetermined fourth number (plurality) of current source transistors each connected in series to a respective fourth setting switch, wherein a number of the fourth setting switches are configured to be activated in accordance with fourth setting signals to set the gain of the continuous-time linear equalizer, particularly in conjunction with the gain of the above gain stage.

Furthermore, the active peaking control unit, the further peaking control unit and the current source unit may be configured to reduce the number of activated diode-connected transistors of the further peaking control unit in accordance with the number of activated current source transistors. Hence, current source transistors operating as current sources can be configured to carry the same current as the diode-connected transistors of the further peaking unit. Thereby, a split-load technique can be applied.

Furthermore, the gain of the continuous-time linear equalizer may be programmably set up independently of peaking and bandwidth by means of a gain stage and/or by means of a programmable current source. The transfer function can be controlled by properly adjusting the current sources, which can be used alternatively to the number of diode-connected transistors or for fine-tuning in conjunction with the diode-connected transistors of the further peaking control unit. This takes advantage of the active peaking characteristics which are mainly defined by the choice of the peaking resistor and the self-gain of the active peaking transistors.

The continuous-time linear equalizer may further comprise a conversion unit for converting a voltage of the signal line to a current supplied to a summing node, so as to allow a summing up of currents provided by a decision feedback analyzer.

The continuous-time linear equalizer may further comprise a track-and-hold switch to couple the signal line to the conversion unit.

Moreover, the continuous-time linear equalizer may further comprise an even and odd track-and-hold switch to couple the signal line to two separated conversion units.

Alternatively, the continuous-time linear equalizer may further comprise an even and odd track-and-hold switch to couple the output of the conversion unit to an even and an odd summing node, respectively.

In particular, the continuous-time linear equalizer may further include a common gate stage transistor which is coupled to one terminal with an input of the continuous-time linear equalizer and to a further terminal with the signal line, wherein a gate terminal of the common gate stage transistor is coupled to a predetermined control voltage or an output of a regulation amplifier providing a comparison result between a control voltage and the input signal; and a current source for supplying a predetermined current to the signal line.

The common gate stage transistor allows the input transconductance of the gain stage to operate within a wider voltage range.

According to an embodiment, the continuous-time linear equalizer may be implemented in a differential configuration and have differential signal lines, wherein the transistors in the one or more units are mirrored.

It may be provided that the continuous-time linear equalizer further comprises a differential negative impedance unit comprising a fifth number of cross-coupled transistor pairs each comprising two cross-coupled transistors, wherein gate terminals of the cross-coupled transistors are coupled to the respective other differential signal line and wherein the one terminal of each of the cross-coupled transistors is coupled to a respective one of the signal lines and another terminal of each of the cross-coupled transistors is coupled to a respective one of fifth setting switches to activate the respective cross-coupled transistor pair according to fifth setting signals, wherein the further terminals of each pair of the cross-coupled transistors are interconnected with a cross capacity.

Moreover, the differential active peaking control unit may further comprise a first number of cross-coupling capacitor pairs each including two capacitors each coupling a gate terminal of a respective one of the active peaking transistors of the active peaking transistor pair to a terminal of a respective other of the active peaking transistors of the respective active peaking transistor pair.

According to an embodiment, a differential gain stage may be formed for coupling the input signals to the respective signal line for providing a predetermined or variable transconductance. Particularly, the differential gain stage may be formed as a telescopic stage.

According to an embodiment, a differential conversion unit may comprise regenerative cascaded transistor pairs which are coupled serially to the respective conversion transistors and are configured with transistors being cross-coupled with respect to the signal lines. Furthermore, the continuous-time linear equalizer may further comprise a setting unit for providing the respective setting signals according to a predetermined setting or depending on a result of an optimization, particularly on minimizing a bit error rate.

It may be provided that the resistance of the active peaking resistor is chosen so that the frequency where the numerator of a transfer function of the continuous-time linear equalizer is zero is smaller than the frequency of the poles of the denominator of the transfer function.

FIG. 1 schematically shows a non-differential continuous-time linear equalizer 10 for use in a receiving unit of a transmission system. The continuous-time linear equalizer 10 usually serves as the first stage in the receiving unit to which the incoming analog signal is applied. The continuous-time linear equalizer 10 is preferably implemented in CMOS technology.

In the present case, the incoming signal is represented by an incoming voltage signal $V_{in}$. The incoming voltage signal $V_{in}$ is applied to a gain unit 11 which provides a predetermined gain $G_{m1}$. The output signal of the gain unit 11 is applied to a signal line 12 which provides an output voltage $V_{out}$ of the continuous-time linear equalizer 10.

Between the signal line 12 and a power supply rail 13, an active peaking control unit 14 is applied. The power supply rail 13 may correspond to a source of a low power supply potential, such as a ground potential $V_{GND}$, or to a high power supply potential such as $V_{DD}$. The present and following embodiments are described with respect to a power supply rail 13 which is formed by a source of a ground potential $V_{GND}$, so that the main components can be formed by means of NMOS transistors. In case of a power supply rail 13 which is formed by a source of a high power supply potential $V_{DD}$, the main components can be formed analogously by means of MOS transistors having a different conductivity type, such as of PMOS transistors.

The active peaking control unit 14 has an array of a predetermined first number N of active peaking transistors 15 each of which is coupled with its drain terminal to the signal line 12 and with its source terminal to a respective first setting switch 16 which may be implemented by an NMOS transistor. The gate terminals of the active peaking transistors 15 are interconnected and connected with the signal line 12 via a peaking resistor 17. The first number N can be any number larger than 1, preferably 2, 4, 8, 16, 32, or 64.

The active peaking transistors 15 are implemented as NMOS transistors for embodiments in which the power supply rail 13 corresponds to a source of the ground potential $V_{GND}$. The active peaking transistors 15 might be implemented by PMOS transistors in case the power supply rail 13 corresponds to a source of the high power supply potential $V_{DD}$.

Optionally, a further peaking control unit 18 may be provided having a transistor array with the same number of transistors 19 as the predetermined first number of active peaking transistors 15 of the active peaking control unit 14. The transistors 19 are diode-connected, i.e., their gate terminals are directly connected to their drain terminals, respectively. The sources of the diode-connected transistors 19 are each connected to the power supply rail 13 via a complementary first setting switch 20. The number of active peaking transistors 15 and diode-connected transistors 19 of the active peaking control unit 14 and the further peaking control unit 18 may be freely selected and can be, e.g., 64 elements for each of the peaking control units 14, 18.

The first and complementary first setting switches 16, 20 are used to activate the active peaking transistor 15 and the diode-connected transistor 19, respectively, and are controlled via a set of CN(1 . . . N) first setting signals. The non-inverted first setting signals CN(1 . . . N) are applied for controlling the first setting switches 16, while the inverted first setting signals $\overline{CN(1...N)}$ are used for setting the complementary first setting switches 20. The inversion of each of the first setting signals CN(1 . . . N) is made by inverters 21. Hence, the number of activated transistors of the active peaking unit 14 and the further peaking unit 18 is constant for each value of the first setting signals. By selecting each unit separately one by one, a monotonic control of the peaking is realized. The total number of activated transistors should be constant in order to maintain the same gain at low frequency (e.g., at DC).

The first setting signals CN(1 . . . N) are generated or provided by a setting unit 22 which is configured to set the first setting signals CN(1 . . . N) for adapting the characteristics of the continuous-time linear equalizer 10.

Figure 2A:
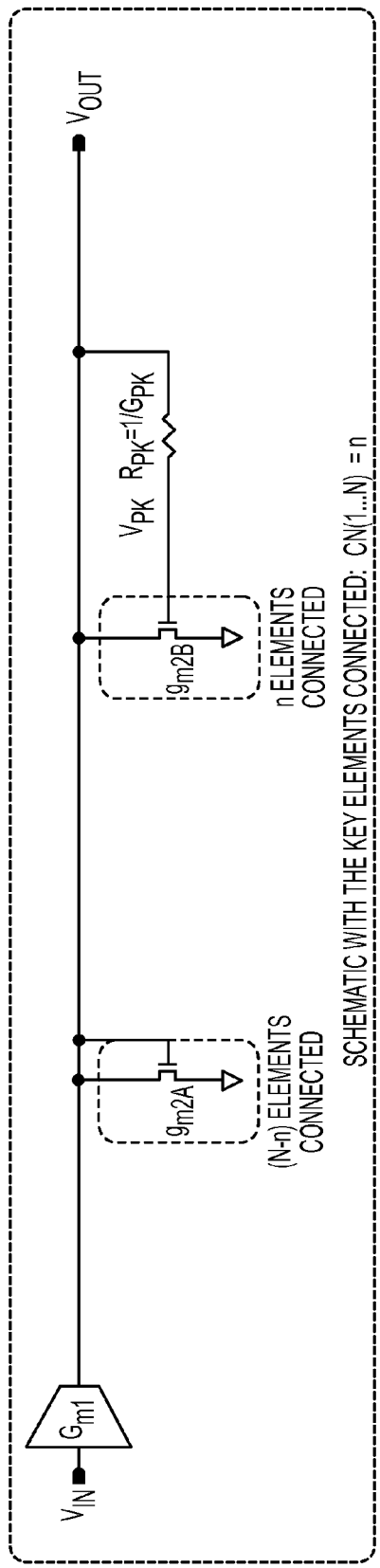
FIGS. 2A, 2B and 2C show auxiliary schematics of the active peaking control unit and the further peaking control unit of the continuous-time linear equalizer of FIG. 1 for deriving the peaking characteristics.
Figure 2B:
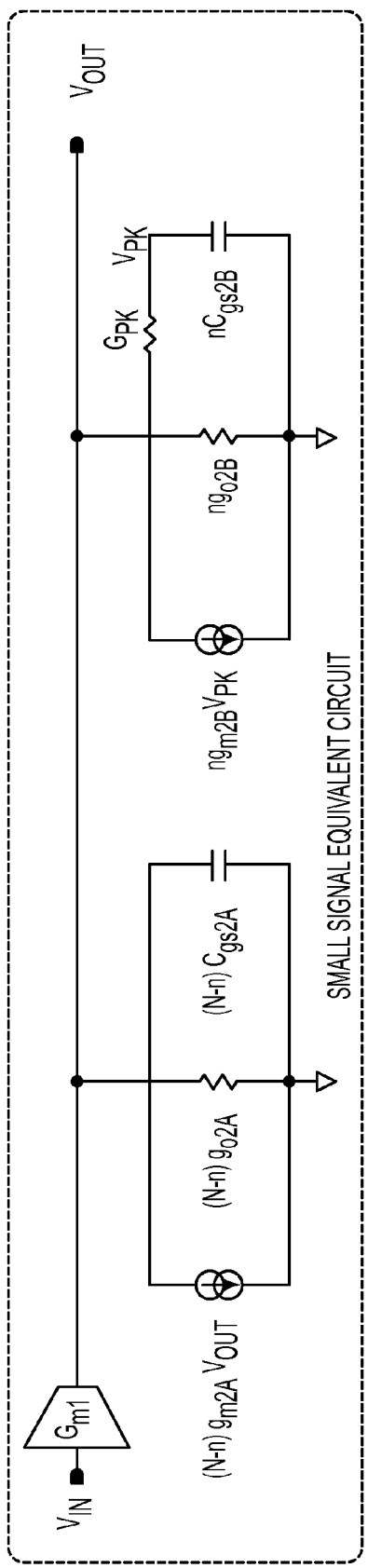
Figure 2C:
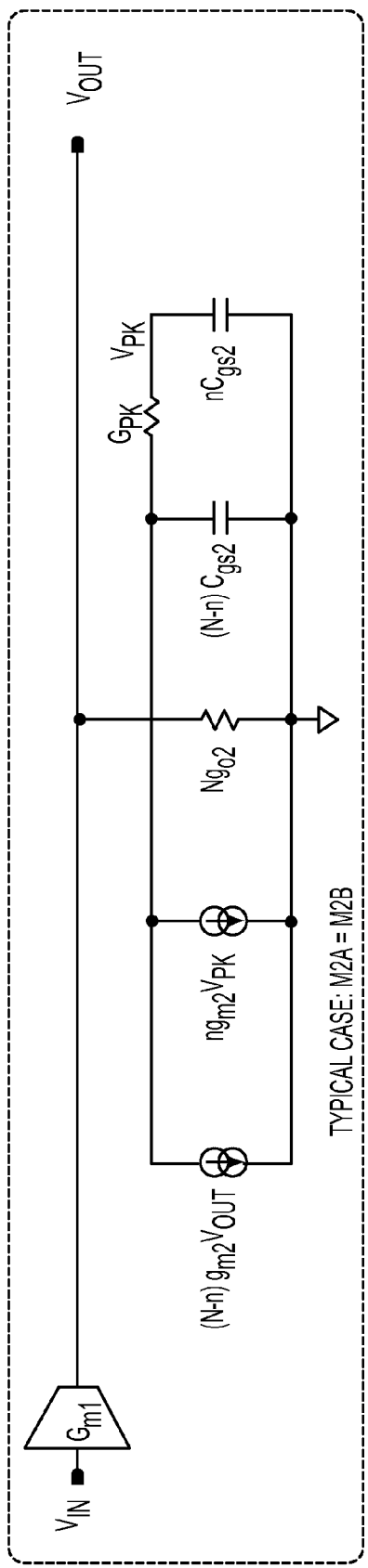

FIG. 2A shows an auxiliary schematic of the active peaking control unit 14 and the further peaking control unit 18 for describing the transfer function. FIGS. 2B and 2C show the small-signal equivalent circuitry of the schematic of FIG. 2A. The parameters of the components are indicated in the Figures as used in the following formulas. The transfer function related to the active peaking control unit 14 and the further peaking control unit 18 is given as follows:

$$\frac{V_{OUT}}{V_{IN}} = \frac{G_{m1}}{N(g_{m2}+g_{o2})} \cdot \frac{1+sn\frac{C_{gs2}}{G_{PK}}}{\left[1+sn\frac{C_{gs2}}{G_{PK}}\left(1-\frac{n}{N}\cdot\frac{g_{m2}}{g_{m2}+g_{o2}}\cdot\frac{1+s\frac{C_{gs2}}{g_{m2}}}{1+s\frac{C_{gs2}}{g_{m2}+g_{o2}}}\right)\right]}$$

wherein n corresponds to the number of activated active peaking transistors 15 of the active peaking control unit 14, $G_{m1}$ to the gain of the gain stage, $g_{m2}$ to the conductivity of the transistors 15 and 19, $C_{gs2}$ to the gate-source-capacity of the transistors 15, 19 and got to the output conductivity of the transistors 15 and 19 (in case the drain of the transistor is considered its output).

At frequencies below the transit frequency $\omega_t < g_{m2}/C_{gs2}$, the transfer function can be simplified as in the following simple analysis. The resistance $R_{PK}$ of the peaking resistor 17 is chosen so that the zero at the numerator is located on the frequency axis before the poles at the denominator.

At frequencies lower than the zero:

$$0 \le \omega \ll \frac{G_{PK}}{n \cdot C_{gs2}} \Rightarrow \frac{V_{OUT}}{V_{IN}} \simeq \frac{G_{m1}}{N \cdot (g_{m2}+g_{o2})}.$$

At frequencies in between the zero and the first poles:

$$\frac{G_{PK}}{n \cdot C_{gs2}} \ll \omega \ll \frac{G_{PK}}{n \cdot C_{gs2}} \cdot \frac{1+\frac{g_{m2}}{g_{o2}}}{1+\left(1-\frac{n}{N}\right)\frac{g_{m2}}{g_{o2}}} \ll \frac{g_{m2}}{C_{gs2}} \Rightarrow$$

$$G_{PK} \ll n \cdot \frac{1+\left(1-\frac{n}{N}\right)\frac{g_{m2}}{g_{o2}}}{1+\frac{g_{m2}}{g_{o2}}} \cdot g_{m2}$$

$$\frac{V_{OUT}}{V_{IN}} \simeq \frac{G_{m1}}{N(g_{m2}+g_{o2})} \cdot \frac{1+sn\frac{C_{gs2}}{G_{PK}}}{1+sn\frac{C_{gs2}}{G_{PK}} \cdot \frac{1+\left(1-\frac{n}{N}\right)\frac{g_{m2}}{g_{o2}}}{1+\frac{g_{m2}}{g_{o2}}}}$$

The peaking characteristic is:

$$Gain_{DC} = \frac{G_{m1}}{N(g_{m2}+g_{o2})}$$

$$\omega_{zero} = \frac{G_{PK}}{n \cdot C_{gs2}}$$

$$\omega_{pole} = \frac{G_{PK}}{n \cdot C_{gs2}} \cdot \frac{1+\frac{g_{m2}}{g_{o2}}}{1+\left(1-\frac{n}{N}\right)\frac{g_{m2}}{g_{o2}}}$$

$$Peak_{dB} = 20\log_{10}\left(\frac{\omega_{pole}}{\omega_{zero}}\right) = 20\log_{10}\left[\frac{1+\frac{g_{m2}}{g_{o2}}}{1+\left(1-\frac{n}{N}\right)\frac{g_{m2}}{g_{o2}}}\right].$$

Figure 3:
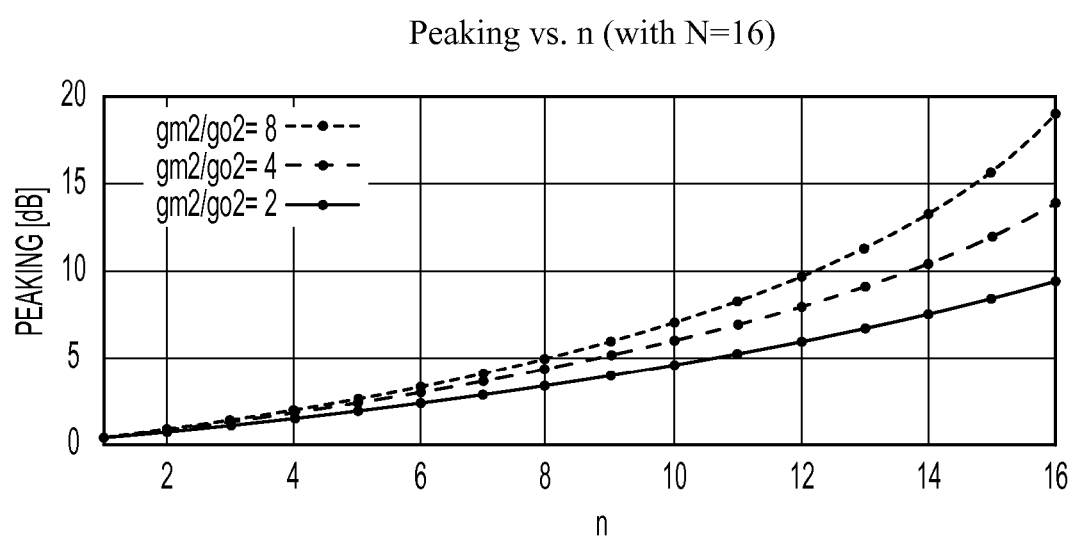
FIG. 3 shows the peaking characteristics for a specific relation between $g_{m2}/g_{o2}$ and for different numbers of peaking resistor-coupled transistors.

In FIG. 3, the characteristics of the number of actively controlled peaking transistors 15 versus the peaking gain is illustrated. It can be seen that the relation between $g_{m2}/g_{o2}$ and the peaking gain increase with the number n of activated active peaking transistors 15. For the simple analysis presented, it can be seen that the amount of peaking is proportional to n and is determined by the self-gain of the transistors 15 used in the array of the active peaking control unit 14.

Referring to FIG. 1, the continuous-time linear equalizer 10 may be further provided with a number of optional units. Firstly, a peaking capacitor unit 25 may be provided which is coupled to the gate-connected terminal of the peaking resistor 17 and the power supply rail 13. The peaking capacitor unit 25 has an array of a predetermined second number M of peaking capacitors 26 each connected with a respective second setting switch 27. The second number M can be any number larger than 1, preferably 2, 4, 8, 16, 32, or 64. The second setting switches 27 may be configured as NMOS transistors in the present embodiment. The second setting switches 27 are controlled by a number of M second setting signals CM (1 . . . M) which are also generated by the setting unit 22. Both the first setting signals CN(1 . . . N) and the second setting signals CM (1 . . . M) may be optimized, e.g., so that the continuous-time linear equalizer bit error rate is minimized.

Furthermore, a bandwidth control unit 28 is provided which is coupled between the signal line 12 and the power supply rail 13. The bandwidth control unit 28 comprises a predetermined third number L of load capacitors 29 which are capable of being activated by a third setting switch 30, respectively. The third number L can be any number larger than 1, preferably 2, 4, 8, 16, 32, or 64. The third setting switches 30 may be configured as NMOS transistors in the present embodiment. In other words, each of the load capacitors 29 is connected in series to the respective third setting switch 30. The third setting switches 30 are controlled by third setting signals CL (1 . . . L) which are generated or provided in the setting unit 22 depending on the required bandwidth of the continuous-time linear equalizer 10.

In the current source unit 32, a programmable current source is provided which may be configured to set up the gain of the continuous-time linear equalizer 10 together with the gain $G_{m1}$ of the gain stage 11.

Figure 4:
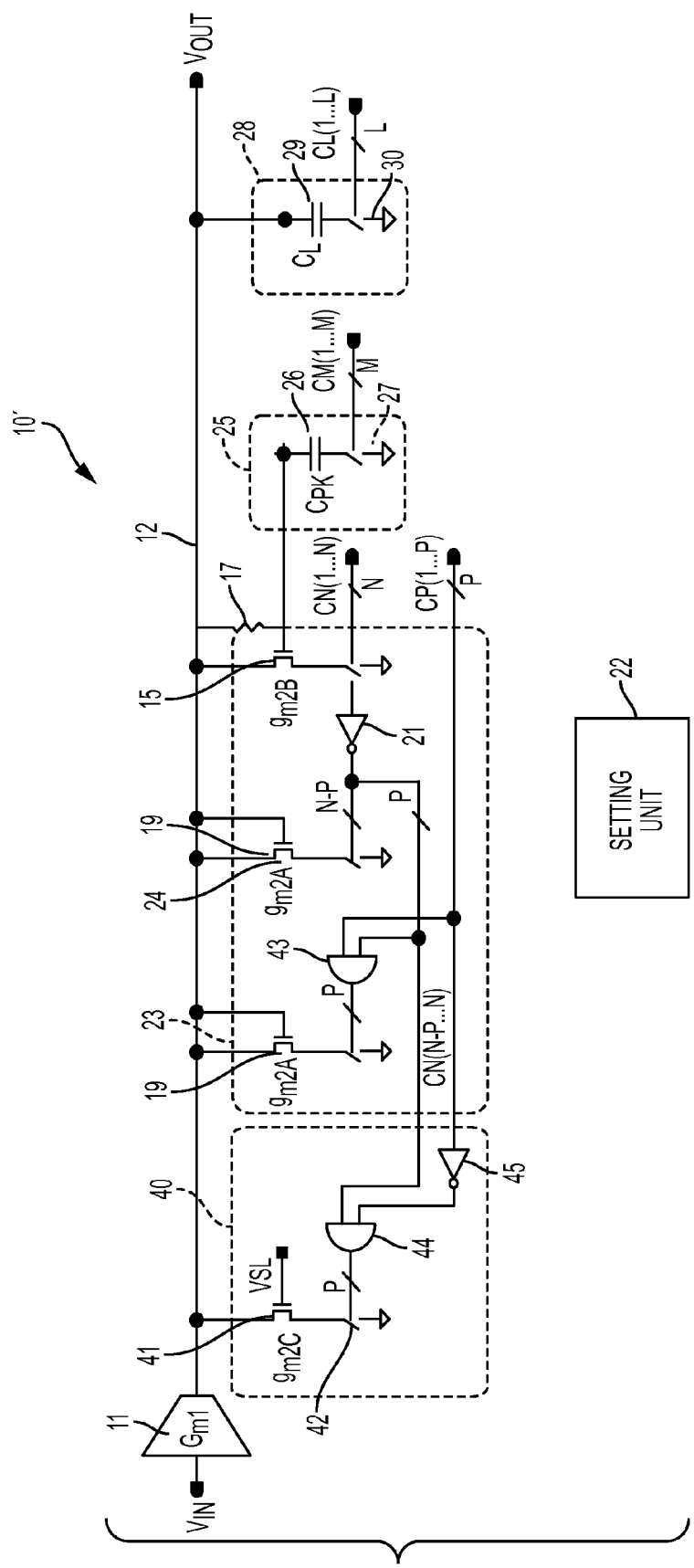
FIG. 4 shows a continuous-time linear equalizer with a programmable current source unit having a number of transistors being activated in place of the same number of diode-connected transistors of a further peaking control unit according to a split-load technique.

FIG. 4 shows a variation of the previously described embodiment, wherein a programmable current source 40 may be configured as an array of a predetermined fourth number P of current source transistors 41 each connected in series with a fifth setting switch 42. The fourth number P can be any number larger than 1, preferably 2, 4, 8, 16, 32, or 64. The current source transistors 41 are coupled with their drain terminals to the signal line 12 and with their source terminals to the power supply rail 13 via a respective fifth setting switch 42. The gate terminals of the current source transistors 41 are applied with a provided bias voltage VSL, so that the current source transistors 41 act as current sources.

A number of current source transistors 41 of the array of the predetermined fourth number P of current source transistors 41 may be activated in place of a corresponding number of diode-connected transistors 19 in the further peaking control unit 18, as described before. This technique can be referred to as a split-load technique.

Furthermore, the diode-connected transistors 19 are split into a first group 23 of P transistors 19 activated depending on the result of an AND-operation (by an AND-element 43) of a number P of the inverted first setting signals CN(N-P+1 . . . N) and the predetermined fourth number P of fourth setting signals CP (1 . . . P), respectively, and a second group 24 of N-P transistors 19 activated depending on the remaining inverted first setting signals CN(1 . . . N-P), respectively. Depending on the fourth number P of fourth setting signals CP(1 . . . P), a resulting number N-P of diode-connected transistors 19 are controlled by the first setting signals CN(N-P+1 . . . P), respectively. The fifth setting switches 42 are controlled by the result of an AND-operation (by an AND-element 44) between the inverted fourth setting signals CP(1 . . . P) (by inverter 45) and the corresponding number of inverted first setting signals CN(N-P+1 . . . N).

With the split-load technique, the continuous-time linear equalizer low-frequency gain can be independently tuned by means of the fourth setting signals CP (1 . . . P) which control a fourth number P of current source transistors 41 operating as current sources. The bias voltage VSL serves to bias the P current source transistors to provide the same current as the active peaking transistors 15. Furthermore, the fourth setting signals CP (1 . . . P) select the current source transistors 41 that are swapped in place of a corresponding number of the diode-connected transistors 19. Hence, the split-load technique provides a means to control the low-frequency gain without affecting the absolute peaking gain.

Figure 5:
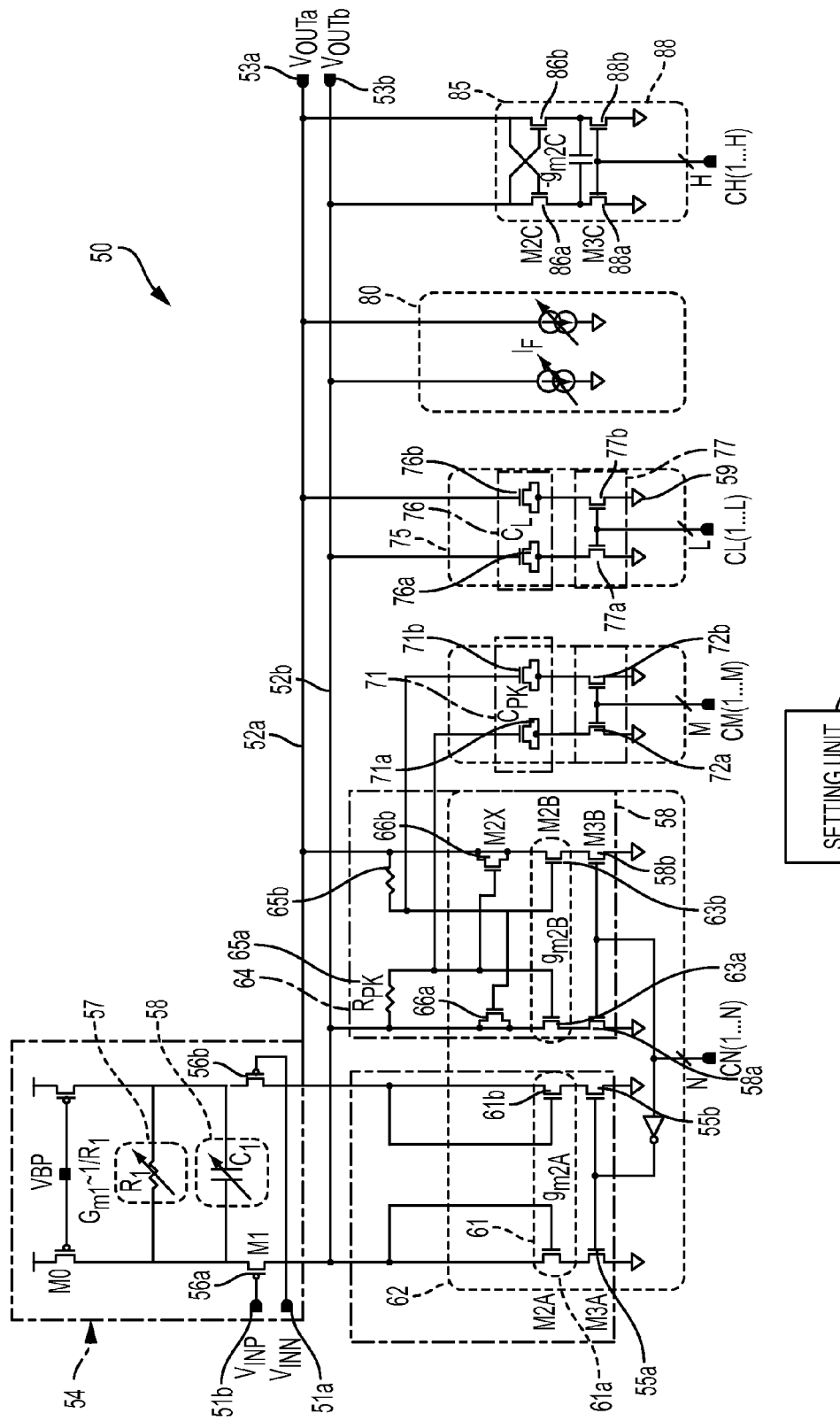
FIG. 5 schematically shows a differential implementation of a continuous-time linear equalizer.

FIG. 5 shows a differential implementation of a continuous-time linear equalizer 50 according to an embodiment. The continuous-time linear equalizer 50 receives at its differential input terminals 51a, 51b differential input signals $V_{INP}$, $V_{INN}$ and outputs via differential signal lines 52a, 52b at its output terminals 53a, 53b differential output signals $V_{OUTa}$, $V_{OUTb}$.

The continuous-time linear equalizer 50 includes a differential gain stage 54. The differential gain stage 54 is connected as a telescopic stage and formed by an input gain transistor pair 56 and the gate of each gain transistor 56a, 56b is coupled to one of the differential input terminals 51. The drains of the respective transistors 56a, 56b are interconnected with a gain stage resistor 57 and a gain stage capacitor 58, respectively, at least one of which can be made programmable to provide tunability of a power-efficient variable gain amplifier.

The telescopic gain stage 54 is current-coupled to a predetermined first number N of diode-connected transistor pairs 61 (diode-connected transistors 61a, 61b) of a further peaking control unit 62 and parallel thereto with the predetermined first number N of active peaking transistor pairs 63 of an active peaking control unit 64.

The gates of the active peaking transistor pairs 63 are each coupled via a single pair of active peaking resistors 63a, 63b to a respective one of the signal lines 52a, 52b. The source terminals of the diode-connected transistor pairs 61 and the active peaking transistor pairs 63 are respectively coupled to a power supply rail 59 via setting switches 55 controlled by the first setting signals CN(1 . . . N) and the inverted first setting signals $\overline{CN(1...N)}$, respectively.

Between the drain terminals of the transistors 63a, 63b of the active peaking control transistor pairs 63 and the gate terminals of the respective other transistor of the active peaking control transistor pairs 63, a cross-coupling capacitor pair 66 (cross-coupling capacitors 66a, 66b) is provided. The cross-coupling capacitor pair 66 may be provided to cancel the differential parasitic capacity which occurs in parallel with the respective peaking resistor 65.

Corresponding to the peaking capacitor unit 25 of the embodiment of FIG. 1, a differential peaking capacitor unit 70 may be optionally provided having a predetermined second number M of peaking capacitor pairs 71 each comprising two peaking capacitors 71a, 71b. The peaking capacitors 71a, 71b are coupled to the respective gates of the transistors 63a, 63b of the active peaking control transistor pair 63. The capacitances may be implemented as the gate capacity of respective MOS transistors. It is understood that each differential branch of each of the peaking capacitor pairs 71 has a pair of setting switches 72 (switches 72a, 72b) controlled by a setting unit 69.

Corresponding to the bandwidth control unit 28 of the embodiment of FIG. 1, a differential bandwidth control unit 75 may be optionally provided having a predetermined third number L of bandwidth control capacitor pairs 76 each comprising two bandwidth control capacitors 76a, 76b. The bandwidth control capacitors 76a, 76b are coupled to the differential signal lines 52a, 52b, respectively. The bandwidth control capacitors 76a, 76b may be implemented as the gate capacity of respective MOS transistors. It is understood that each differential branch of each of the bandwidth control capacitor pairs 76 has a pair of setting switches 77 (switches 77a, 77b) controlled by the setting unit 69.

A differential current source unit 80, which is coupled to the differential signal lines 52a, 52b corresponding to the current source unit 32 of the embodiment of FIG. 1, may optionally also be provided. The split-load technique as described can also be provided in a differential implementation by splitting the number of diode-connected transistor pairs 61a, 61b as described above.

A differential negative impedance unit 85 may be connected to the signal lines 52a, 52b. The differential negative impedance unit 85 has a predetermined fifth number H of cross-coupled transistor pairs 86 each comprising two cross-coupled transistors 86a, 86b. The fifth number H can be any number larger than 1, preferably 2, 4, 8, 16, 32, or 64. The drain terminals of the cross-coupled transistors 86a, 86b are coupled to the differential signal lines 52a, 52b, respectively, and their gate terminals are coupled to the respective other differential signal line 52a, 52b. The cross-coupled transistors 86a, 86b may be implemented as the gate capacity of respective MOS transistors. The source terminals of the cross-coupled transistors 86a, 86b of each of the cross-coupled transistor pairs 86 are interconnected with a cross capacity 87. The source terminals are further connected to transistors of a pair of fifth setting switches 88 (fifth switches 88a, 88b) controlled by a fifth setting signal CH(1 . . . H) provided by the setting unit 69. The differential negative impedance unit 85 acts as an equivalent negative resistance for achieving additional programmable gain by setting the fifth setting signals CH(1 . . . H).

In the above-described embodiments, the transfer function $V_{out}/V_{in}$ can be controlled by properly adjusting the current sources of the current source unit 32, 80. The split-load technique as implemented by the current sources can be used alternatively to the active peaking control unit 14, 64 or in addition thereto for fine-tuning. This takes advantage of the active peaking characteristics which are mainly defined by the choice of the peaking resistor 17, 65 and the self-gain of the active peaking transistors 15, 63a, 63b. In a differential implementation, the current sources may also be made differential to correct the offset.

The low-frequency gain of the transfer function $V_{out}/V_{in}$ can be controlled independently of the peaking by properly adjusting the gain of the gain stage 11, 54. Therefore, the low-frequency gain can be controlled independently from the peaking characteristic of the continuous-time linear equalizer 10, 50.

The active peaking control unit 14, 64 permits a power-efficient implementation of the transconductance of the gain stage 11, 54 when a telescopic stage is used. Particularly, the resistor of the degenerated differential pair may be made programmable to serve in effect as a power-efficient variable gain amplifier.

As shown in FIGS. 6A, 6B and 6C, the input circuitry of the continuous-time linear equalizer 10 can be provided with a common gate stage transistor 90 and a current supply source 91. The embodiments of FIGS. 6A to 6C are shown in a non-differential implementation. However, a differential implementation is possible analogously. It is clear that the embodiments of FIG. 6A to 6C can also be combined or implemented with the optional units 25, 28, 32, 70, 75, 80, 85, such as the peaking capacitor unit 25, the loading capacitor unit 28 and the programmable current source unit 32 etc., as described before.

The common gate stage transistor 90 and a current supply source 91 are serially coupled and the node between one terminal of the common gate stage transistor 90 and the current supply source 91 is connected to the signal line 12 to provide the output signal $V_{out}$ while another terminal of the common gate stage transistor 90 is connected to the output of the gain stage 11. The gate terminal of the common gate stage transistor 90 is connected to a provided control voltage VBC to set a configurable current. The common gate stage transistor 90 allows the input transconductance of the gain stage 11 to operate with a wider voltage range.

In FIG. 6B, the input circuitry of the continuous-time linear equalizer 10, 50 with the common gate stage transistor 90 is shown without a gain stage 11, so that it can be used as a trans-impedance continuous-time linear equalizer 10, 50 with a current input because the source terminal of the common gate stage transistor 90 has a low input impedance.

As shown in FIG. 6C, the low-input impedance of the embodiment of FIG. 6B can be further lowered using a regulation amplifier 92. The regulation amplifier 92 receives a voltage corresponding to the input current $I_{in}$ at its inverting input and the control voltage VBC at its non-inverting input acting like a threshold. The output of the regulation amplifier 92 is connected to the gate terminal of the common gate stage transistor 90 instead of the control voltage VBC. In a differential implementation, the control voltage VBC may substantially correspond to the control voltage VBC of the optional cascode transistor unit as used in conjunction with the conversion unit.

Figure 7:
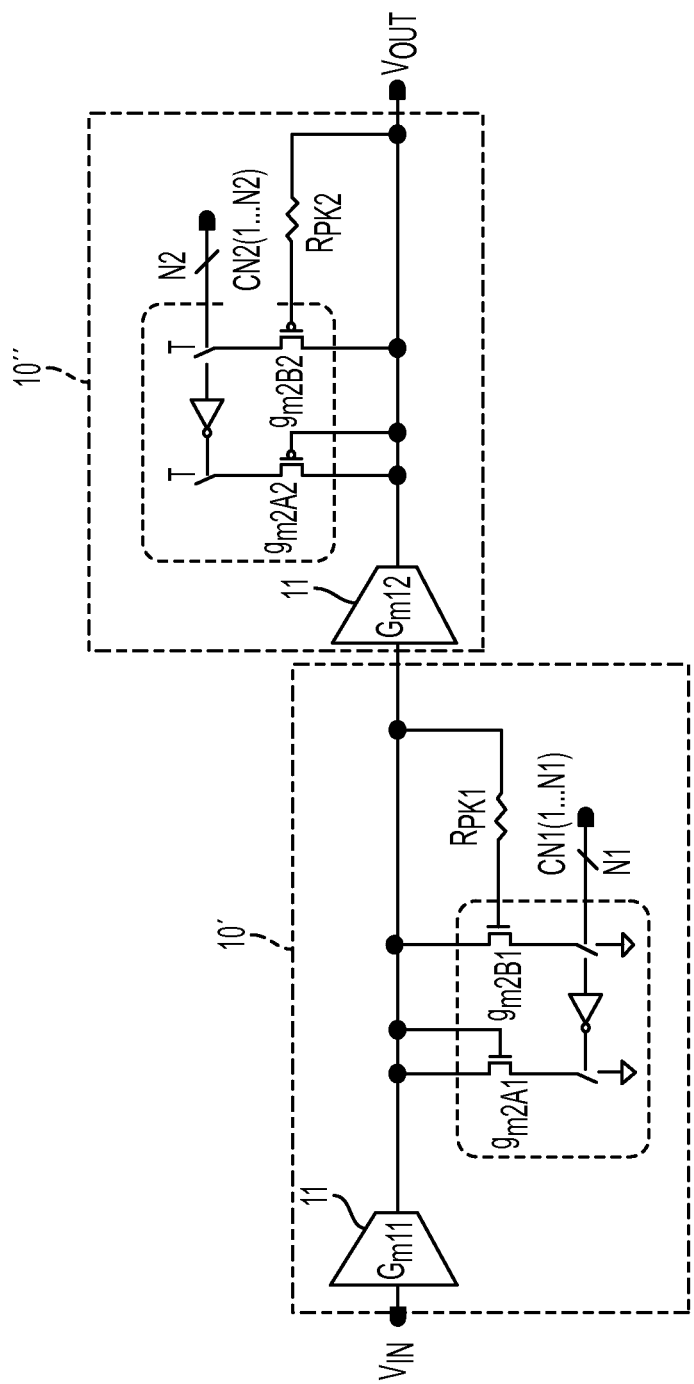
FIG. 7 schematically shows a cascaded implementation of a continuous-time linear equalizer.

As shown in FIG. 7, a continuous-time linear equalizer can also be implemented with cascading similar stages, such as cascading a continuous-time linear equalizer 10 of the embodiment as shown in FIG. 1 with a similar continuous-time linear equalizer 10, with the difference of applying respective transistors having a different conductivity type, such as PMOS. The same concept can be applied to the differential implementation as well. It should be noted that the first setting signals and/or the peaking resistances can be set differently for the different stages of cascaded continuous-time linear equalizers 10', 10". It is further clear that each of the stages can be implemented with one or more optional units and that the first to sixth numbers as defined as the numbers of the components in the arrays of the units in each of the different stages of the continuous-time linear equalizer 10', 10" can be respectively equal or different for the multiple stages. For example the first number N can be set to N1 for a first stage 10' of the continuous-time linear equalizer and to N2 for a second stage 10" of the continuous-time linear equalizer.

Figure 8:
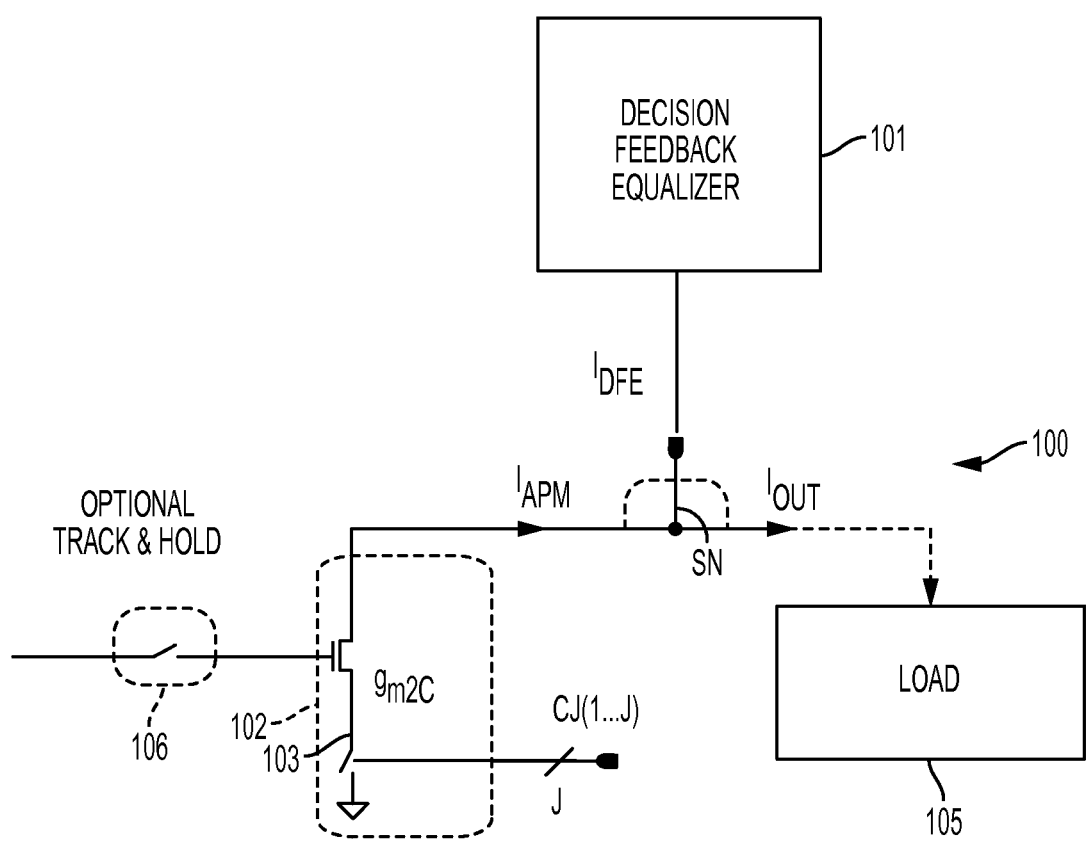
FIG. 8 shows a conversion unit to be applied to the output of a continuous-time linear equalizer.

As shown in FIG. 8, the output of any of the previously described continuous-time linear equalizers 10, 50 may be further processed in a voltage/current conversion unit 100, e.g., to be used by a decision feedback equalizer 101. In a decision feedback equalizer 101 having a number k of taps, the k digitized symbols may substantially be fed back to cancel the intersymbol interference caused by their dispersion in time. The operation of the decision feedback equalizer 101 requires a linear superposition of the analog magnitudes of the last k received symbols which are digitized and weighted.

Thus, there is provided a conversion unit 100 which is to be connected to the output of any continuous-time linear equalizer such as the above described continuous-time linear equalizers 10, 50. The conversion unit 100 substantially corresponds to a current source set by the output voltage $V_{out}$. The output voltage $V_{out}$ of the continuous-time linear equalizer 10, 50 is coupled to gate terminals of a predetermined sixth number J of conversion transistors 102. The sixth number J can be any number larger than 1, preferably 2, 4, 8, 16, 32, or 64. The array of conversion transistors 102 is configured by sixth setting signals CJ(1 . . . J) to convert the output voltage $V_{out}$ of the continuous-time linear equalizer 10, 50 to a converted current $I_{APM}$ which is fed to a summing node SN. The source terminals of each of the conversion transistors 102 are coupled with a sixth setting switch 103, respectively, each controlled by one of the sixth setting signals CJ(1 . . . J), so that the number of used conversion transistors 102 can be set to tune the gain of the conversion unit 100.

The inherent linearity of the summing node SN also enhances the gain of the summing node SN. In conventional approaches, the input stage of the current summing at the summing node SN employs resistive degeneration to maintain linearity while affecting the gain; the proposed solution as shown in FIG. 8 applies no degeneration, so that the conversion of voltage to current is more efficient in realizing a higher gain for the system.

By achieving the linearity of the conversion, the superposition of additional currents $I_{DFE}$ at the summing node SN can be enabled, wherein the additional currents $I_{DFE}$ may be generated by a current steering or a switched capacitor decision feedback equalizer 101.

Furthermore, the resulting output current $I_{out}$, which is the sum of the added currents $I_{APM}$ provided by the conversion transistors 102 and the input current $I_{DFE}$ from the decision feedback equalizer 101, is applied to a load 105, which may be a resistive load or a switched capacitor network.

Optionally, the gate terminal of the conversion transistors 102 can be coupled to the output voltage $V_{out}$ via a track-and-hold unit 106. The track-and-hold unit 106 may be used for low-frequency timing and for an adaption to clock signals.

Figure 9:
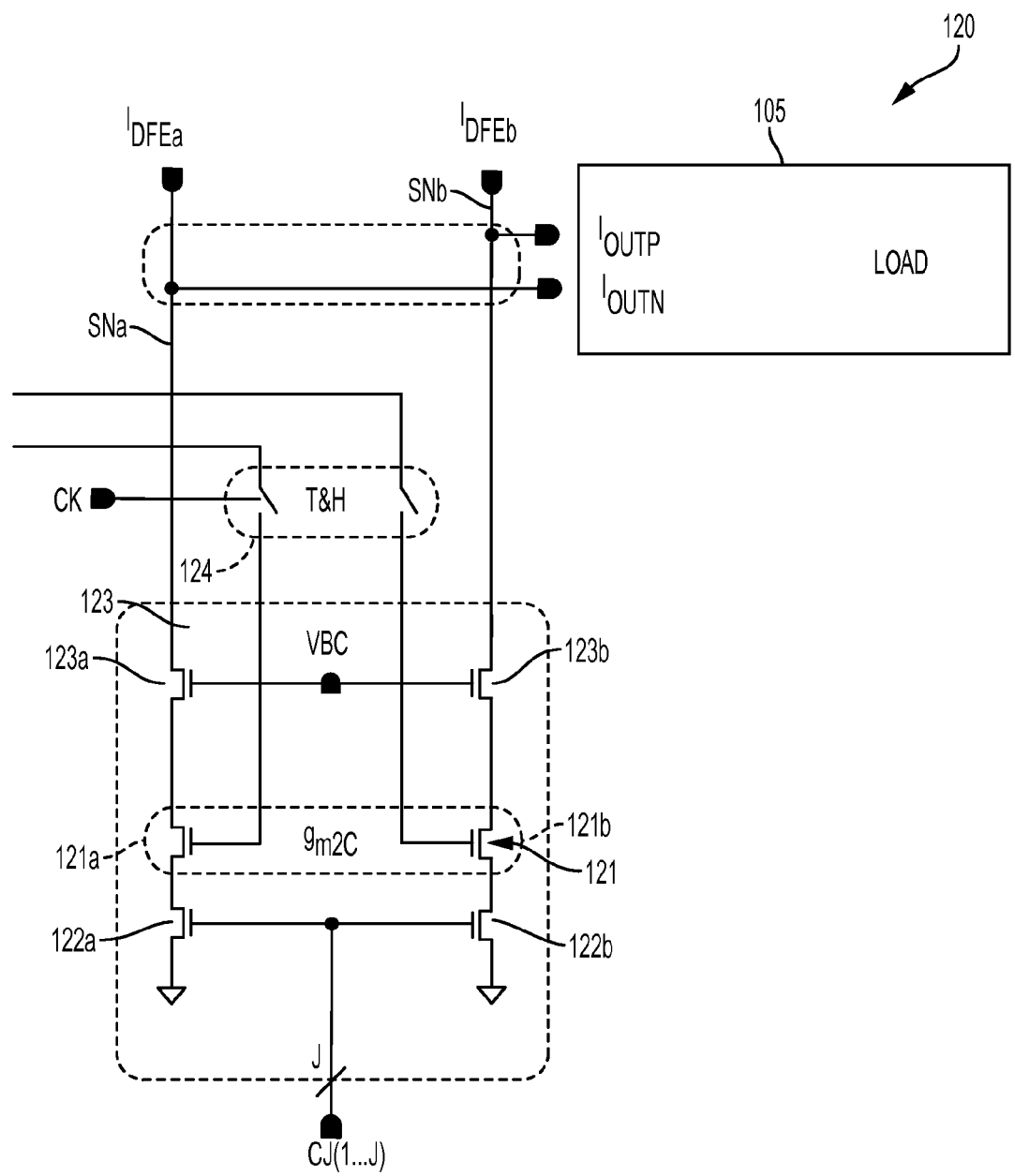
FIG. 9 shows a differential implementation of a conversion unit to be applied to the output of a continuous-time linear equalizer.

FIG. 9 shows a conversion unit 120 in a differential implementation with conversion transistor pairs 121 (conversion transistor 121a, 121b), sixth setting switches 122a, 122b an optional track-and-hold unit 124 and two summing nodes SNa, SNb each of which substantially corresponds in its function to the respective unit of the embodiment of FIG. 8, i.e., to add additional currents $I_{DFEa}$, $I_{DFEb}$ provided by a decision feedback equalizer or the like. In series to the conversion transistor pairs 121, cascaded transistor pairs 123 (cascaded transistors 123a, 123b) may be arranged to be applied with a bias control voltage VBC.

Figure 10:
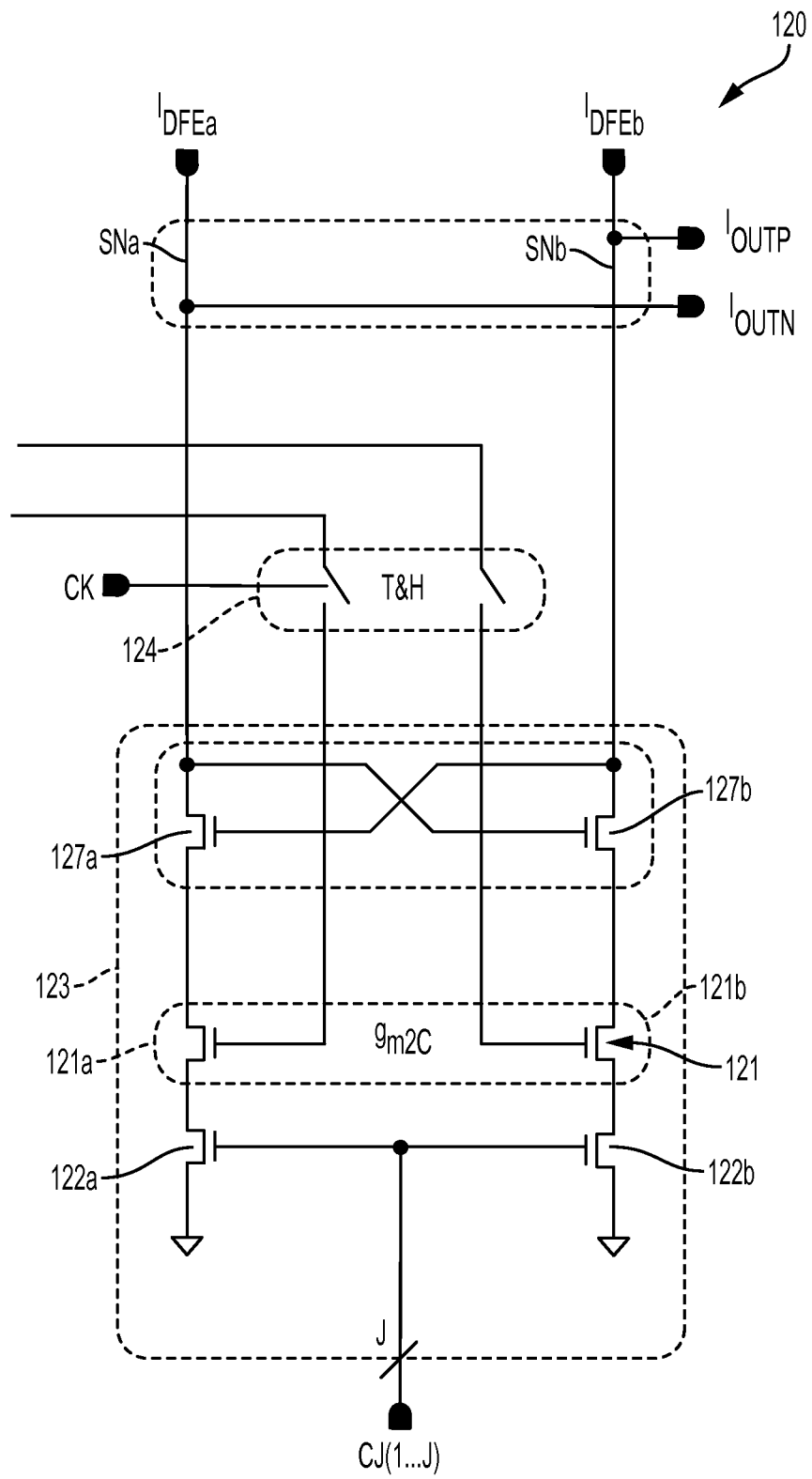
FIG. 10 shows a differential implementation of a conversion unit to be applied to the output of a continuous-time linear equalizer with cross-coupled transistors instead of the cascoded transistor pairs of FIG. 9.

As shown in FIG. 10, regenerative cascoded transistor pairs 127 (regenerative cascoded transistors 127a, 127b) may be configured as cross-coupled transistors 86a, 86b instead of the cascoded transistor pairs 123. The technique may effectively improve the differential output impedance at the current-summing nodes SNa, SNb.

Figure 11:
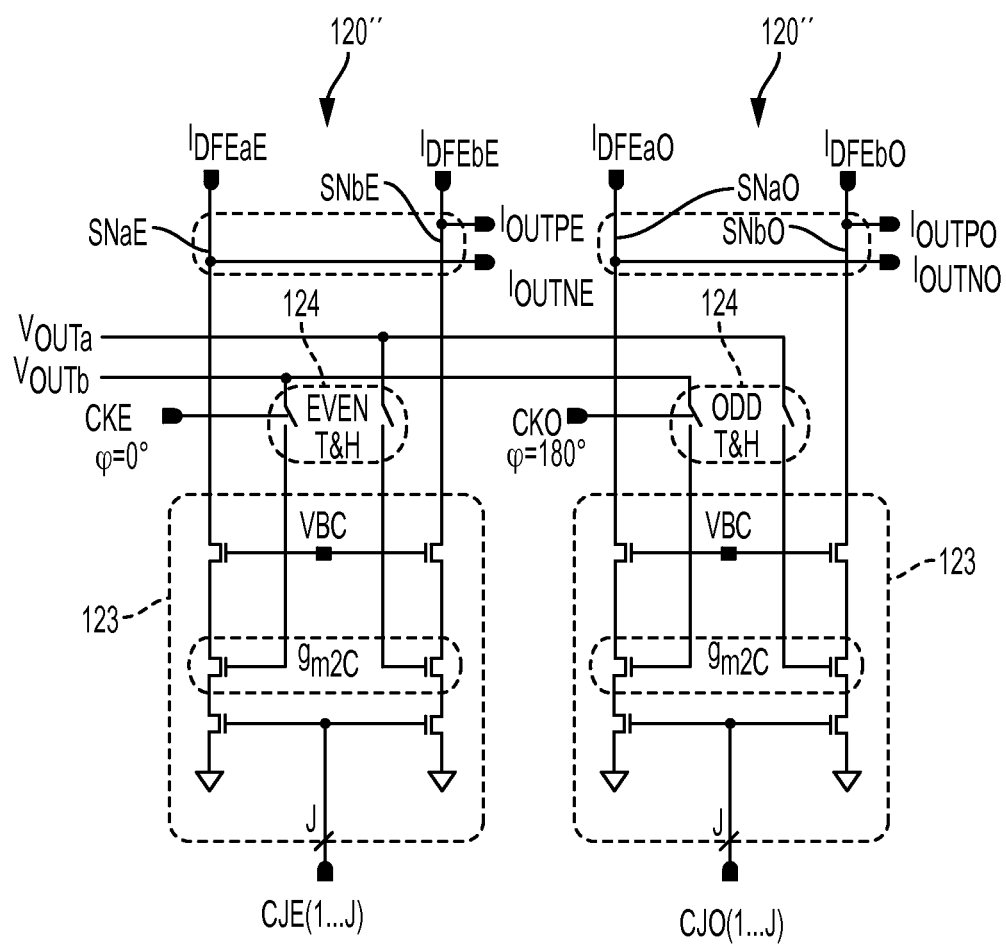
FIG. 11 shows an interleaved topology of a differential implementation of a conversion unit to be applied to the output of a continuous-time linear equalizer.

The differential conversion unit 120 can also be configured in an interleaved topology, as shown in FIG. 11. In this case, two differential conversion units 120, an even conversion unit 120' and an odd conversion unit 120" (the reference signs of the different conversion units are further referred to with ' and "), are provided in parallel, each of which is coupled to the output voltage $V_{out}$ of any type of continuous-time linear equalizer 10, 50 by means of a respective track-and-hold unit 124', 124". The track-and-hold units 124', 124" each have a pair of track-and-hold switches 124a', 124b', 124a", 124b". Each pair of track-and-hold switches 124a', 124b', 124a", 124b" is controlled by mutually inverted clock signals, respectively.

Figure 12:
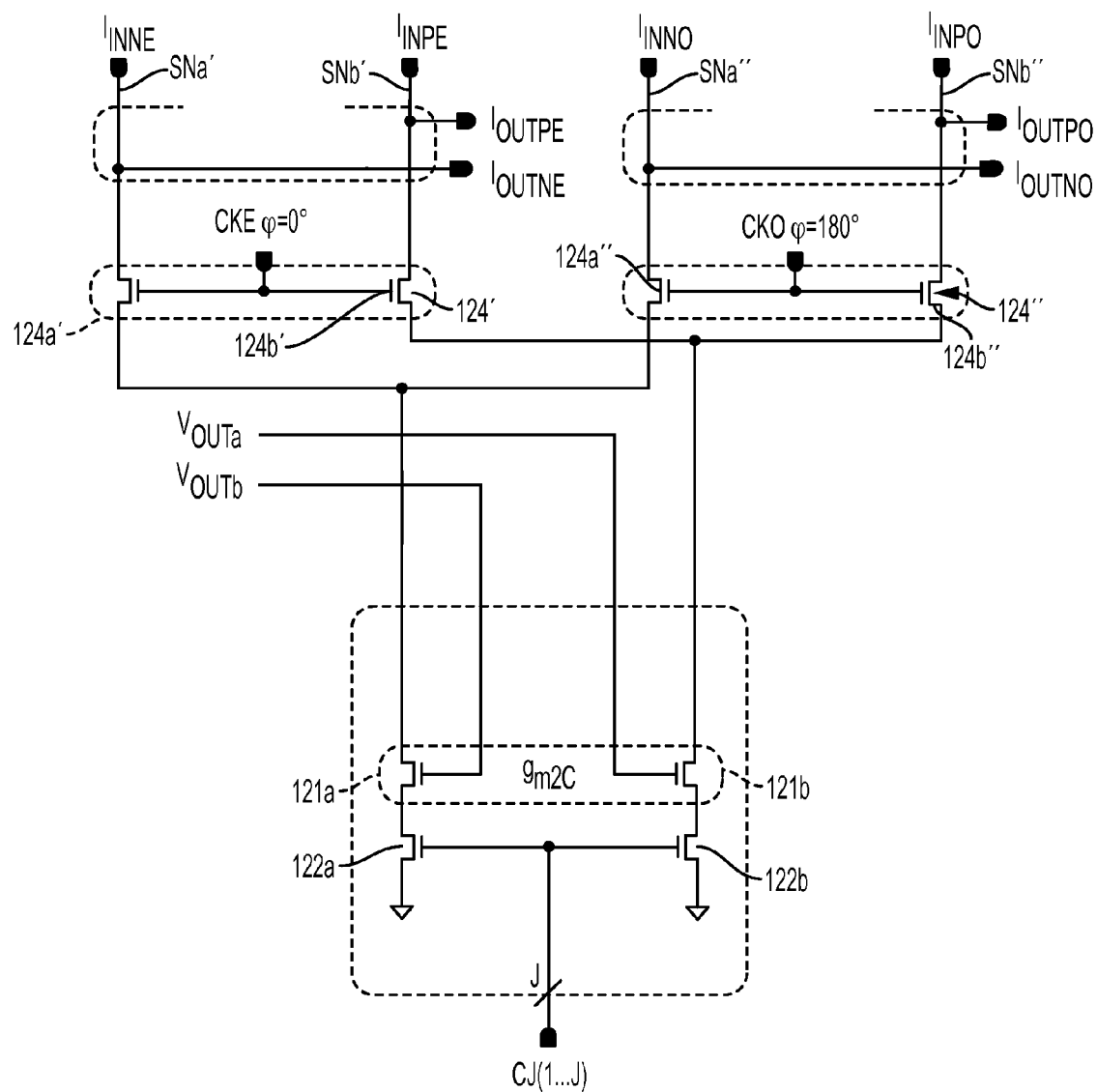
FIG. 12 shows a simplified interleaved topology of the differential implementation of the conversion unit of FIG. 11.

For the interleaved configuration of FIG. 11, as shown in FIG. 12, the conversion transistor pairs 121 and the setting switches 122a, 122b can be commonly provided, wherein the track-and-hold units 124', 124" are connected in parallel to the common conversion transistor pair 121. At the summing nodes SNaE, SNbE, SNaO, SNbO, the additional currents $I_{DFEaE}$, $I_{DFEbE}$, $I_{DFEaO}$, $I_{DFEbO}$, provided by a decision feedback equalizer or the like.

As shown in FIG. 12, the power efficiency can be improved by avoiding a track-and-hold and by steering the output current into the interleaved loads 105. Therefore, the current on the conversion unit 100, 120 is always efficiently used along the signal path. With this technique, a reset phase is also readily available when the current is steered away from the respective summing node SN.

Figure 13:
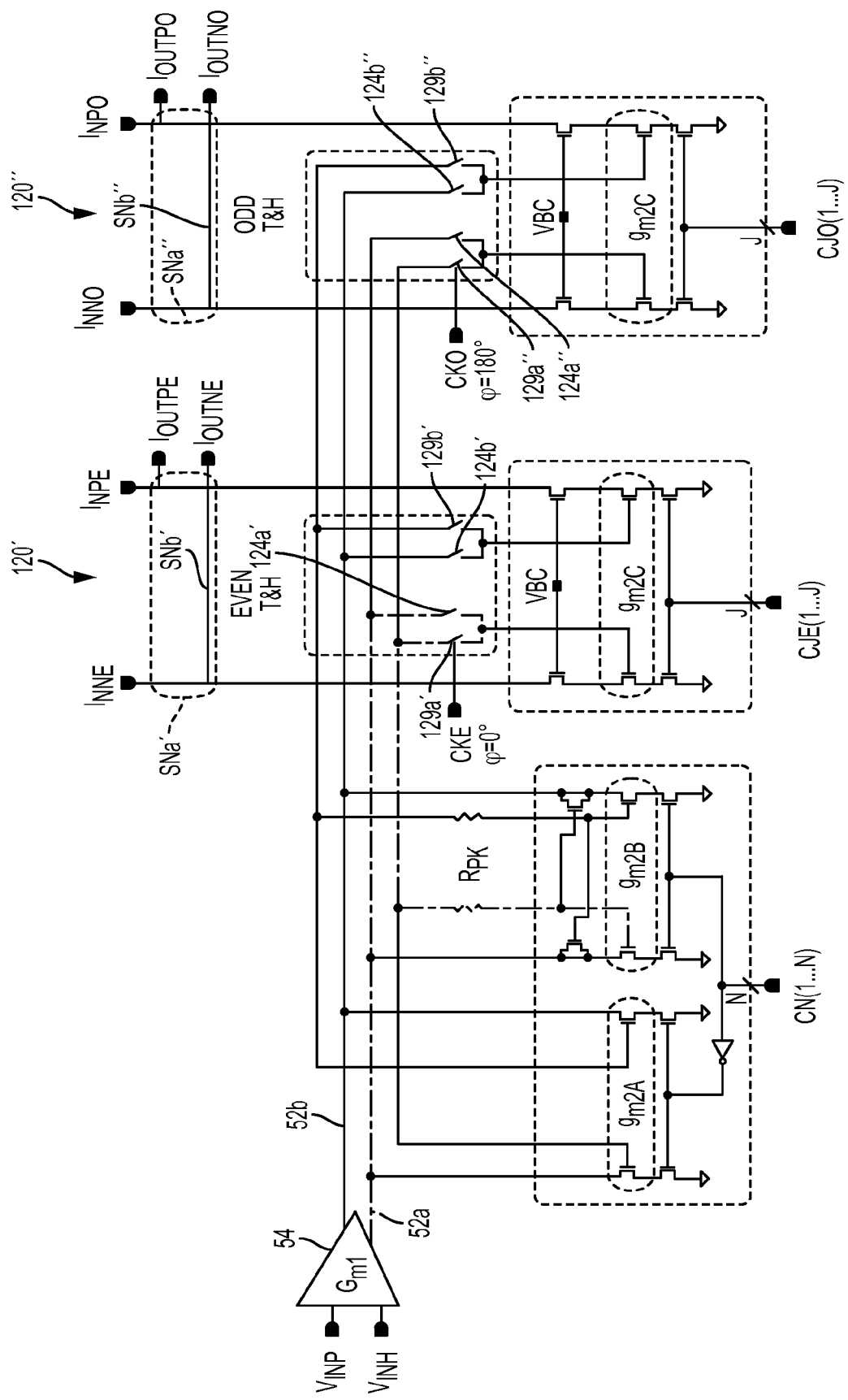
FIG. 13 shows an interleaved topology of a differential implementation of a conversion unit with each of the track and hold switches being combined with a further track-and-hold switch to provide an interleaved coupling of the further peaking control unit.

For the interleaved configurations of FIGS. 11 and 12, as shown in FIG. 13, the diode-connected transistors 19, 61a, 61b and/or the active peaking transistors 15, 63a, 63b can also be coupled with the respective signal line 52a, 52b via the track-and-hold switches 124a', 124b', 124a", 124b". To each of the track-and-hold switches 124a', 124b', 124a", 124b" a further track-and-hold switch 129a', 129b', 129a", 129b" is connected between the gate terminal of the respective conversion transistor 102 and the gate terminals of the diode-connected transistors 19, 61a, 61b and/or the active peaking transistors 15, 63a, 63b. Each further track-and-hold switch 129a', 129b', 129a", 129b" is switched synchronously with the further track-and-hold switch 129a', 129b', 129a", 129b", so that the gate terminals of the diode-connected transistors 19, 61a, 61b and/or the active peaking transistors 15, 63a, 63b are connected to the respective signal line 52a, 52b.

Therefore, the track-and-hold switches 124a', 124b', 124a", 124b", 129a', 129b', 129a", 129b" become part of the active peaking control unit 14, 64 and the further peaking control unit 18, 62. Therefore, their on-resistance contributes to the enhancement of the peaking characteristics of the continuous-time linear equalizer 10, 50 without substantially affecting the tracking bandwidth.

A configuration according to this embodiment can be applied particularly at low supply voltages, because it avoids the need of using more complex techniques, such as bootstrapping, in order to maintain sufficient tracking bandwidth.

REFERENCE LIST 10 continuous-time linear equalizer
10', 10" cascaded continuous-time linear equalizers
11 gain stage
12 signal line
13 power supply rail
14 active peaking control unit
15 active peaking transistor
16 first setting switch
17 peaking resistor
18 further peaking control unit
19 diode-connected transistor
20 complementary first setting switch
21 inverter
22 setting unit
23 first group of P transistors 19
24 second group of N-P transistors 19
25 peaking capacitor unit
26 peaking capacitor
27 second setting switch
28 bandwidth control unit
29 load capacitor
30 third setting switch
32 current source unit
40 programmable current source
41 current source transistor
42 fifth setting switch
43 AND-element
44 AND-element
45 inverter
50 continuous-time linear equalizer
51 differential input terminal
52a, b signal lines
53 output terminal
54 differential gain stage
55 setting switches
56 input gain transistor pair
57 gain stage resistor
56a, b gain transistors
58 gain stage capacitor
59 power supply rail
61 diode-connected transistor pair
61a, b diode-connected transistors
62 further peaking control unit
63 active peaking transistor pair
63a, b active peaking transistors
64 active peaking control unit
65 peaking resistor
66 cross-coupling capacitor pair
66a, b cross-coupling capacitors
69 setting unit
70 differential peaking capacitor unit
71 peaking capacitor pair
71a, b peaking capacitors
72 current source unit
72 pair of setting switches
72a, b setting switches
75 differential bandwidth control unit
76 bandwidth control capacitor pair
76a, b bandwidth control capacitors
77 pair of setting switches
77a, b setting switches
80 differential current source unit 85 differential negative impedance unit
86 cross-coupled transistor pair
86a, b cross-coupled transistors
87 cross capacity
88 pair of fifth setting switches
88a, b fifth setting switches
90 common gate stage transistor
91 current supply source
92 regulation amplifier
100 conversion unit
101 decision feedback equalizer
102 conversion transistor
103 sixth setting switch
105 load
106 track-and-hold unit
120 differential conversion unit
120' even conversion unit
120" odd conversion unit
121 conversion transistor pair
121a, b conversion transistors
122a, b sixth setting switches
123 cascoded transistor pair
123a, b cascaded transistors
124 track-and-hold unit
124', 124" track-and-hold units
124a', 124b',
124a", 124b" track-and-hold switches
127 regenerative cascoded transistor pair
127a, 127b regenerative cascoded transistors
$C_{gs2}$ gate-source-capacity of the transistors 15, 19
$G_{m1}$ (predetermined) gain of the gain stage 11
CH(1 . . . H) fifth setting signals
CJ(1 . . . J) sixth setting signals
CL (1 . . . L) third setting signals
CM (1 . . . M) second setting signals
CN(1 . . . N) first setting signals
CP (1 . . . P) fourth setting signals
$g_{m2}$ conductivity of the transistors 15 and 19
$g_{o2}$ output conductivity of the transistors 15 and 19
$I_{APM}$ converted current
$I_{DFE}$ additional current
$I_{in}$ input current
$I_{out}$ output current
N first number of active peaking transistors
SN, SNa, SNb summing nodes
VBC (bias) control voltage
$V_{DD}$ high power supply potential
$V_{GND}$ ground potential (low power supply potential)
$V_{in}$ incoming voltage signal
$V_{INP}$, $V_{INN}$ input signals
$V_{out}$ output voltage
$V_{OUTa}$, $V_{OUTb}$ differential output signals
VSL bias voltage
$\omega_t$ transit frequency

The invention claimed is:

1. A continuous-time linear equalizer in a receiving unit of a high-speed data transmission system for receiving an input signal, the continuous-time linear equalizer configured to:
provide an equalized output voltage with a signal line; and
operate an active peaking control unit, comprising:
a predetermined first number of active peaking transistors each coupled between the signal line and a power supply rail;
a peaking resistor that couples gate terminals of each of the active peaking transistors to the signal line; and
a first number of first setting switches each associated with each of the first number of active peaking transistors to activate a predetermined number of the first number of active peaking transistors according to first setting signals,
wherein the continuous-time linear equalizer is implemented in CMOS technology.

2. The continuous-time linear equalizer of claim 1, wherein the continuous-time linear equalizer is further configured to couple, with a gain stage, the input signal to the signal line to provide one of a predetermined or a variable transconductance.

3. The continuous-time linear equalizer of claim 2, wherein the continuous-time linear equalizer is further configured to couple a number of serially coupled stages each at least comprising a gain stage and an active peaking control unit, wherein the active peaking control unit is coupled to a different potential of the power supply rail.

4. The continuous-time linear equalizer of claim 1, wherein the continuous-time linear equalizer is further configured to couple a further peaking control unit, having a first number of diode-connected transistors, between the signal line and the power supply rail, and a first number of complementary first setting switches each associated with each of the first number of diode-connected transistors to activate a predetermined number of the first number of transistors according to inverted first setting signals, so that a total number of activated active peaking transistors and a total number of the diode-connected transistors are the same.

5. The continuous-time linear equalizer of claim 1, wherein the continuous-time linear equalizer is further configured to couple a peaking capacitor unit having a predetermined second number of peaking capacitors between the gate-connected terminal of the peaking resistor and the power supply rail, and a second number of second setting switches each associated with each of the second number of peaking capacitors to activate a predetermined number of the second number of peaking capacitors according to second setting signals.

6. The continuous-time linear equalizer of claim 1, wherein the continuous-time linear equalizer is further configured to couple a bandwidth control unit having a predetermined third number of load capacitors between the signal line and the power supply rail, and a third number of third setting switches each associated with each of the third number of load capacitors to activate a predetermined number of the third number of load capacitors according to third setting signals.

7. The continuous-time linear equalizer of claim 4, wherein the continuous-time linear equalizer is further configured to connect a current source unit, which is configured as a predetermined fourth number of current source transistors, in series with a respective fourth setting switch, wherein a number of the fourth setting switches are configured to be activated in accordance with fourth setting signals to set a gain of the continuous-time linear equalizer.

8. The continuous-time linear equalizer of claim 7, wherein the active peaking control unit, the further peaking control unit and the current source unit are configured to reduce a number of activated diode-connected transistors of the further peaking control unit in accordance with the number of activated current source transistors.

9. The continuous-time linear equalizer of claim 1, wherein the continuous-time linear equalizer is further configured to convert, with a conversion unit, a voltage of the signal line to a current supplied to a summing node, so as to allow a summing up of currents provided by a decision feedback equalizer.

10. The continuous-time linear equalizer of claim 9 wherein the continuous-time linear equalizer is further configured to configure a track-and-hold switch to couple the signal line to the conversion unit.

11. The continuous-time linear equalizer of claim 9, wherein the continuous-time linear equalizer is further configured to configure an even and odd track-and-hold switch to couple the signal line to two separated conversion units.

12. The continuous-time linear equalizer of claim 9 wherein the continuous-time linear equalizer is further configured to configure an even and odd track-and-hold switch to couple the output of the conversion unit to an even and an odd summing node, respectively.

13. The continuous-time linear equalizer of claim 1, wherein the continuous-time linear equalizer is further configured to:
couple a common gate stage transistor to one terminal with an input of the continuous-time linear equalizer and to a further terminal with the signal line, wherein a gate terminal of the common gate stage transistor is coupled to one of a predetermined control voltage or an output of a regulation amplifier providing a comparison result between a control voltage and the input signal; and
configure a current source to supply a predetermined current to the signal line.

14. The continuous-time linear equalizer of claim 1, wherein the continuous-time linear equalizer is implemented in a differential configuration and has differential signal lines, wherein the active peaking transistors in the one or more units are mirrored.

15. The continuous-time linear equalizer of claim 14, wherein the continuous-time linear equalizer is further configured to configure a differential negative impedance unit comprising a fifth number of cross-coupled transistor pairs each comprising two cross-coupled transistors, wherein gate terminals of the cross-coupled transistors are coupled to the respective other differential signal line and wherein the one terminal of each of the cross-coupled transistors is coupled to a respective one of the signal lines and another terminal of each of the cross-coupled transistors is coupled to a respective one of fifth setting switches to activate the respective cross-coupled transistor pair according to fifth setting signals, wherein the gate terminals of each pair of the cross-coupled transistors are interconnected with a cross capacity.

16. The continuous-time linear equalizer of claim 14, wherein the active peaking control unit further comprises a first number of cross-coupling capacitor pairs each including two capacitors each coupling a gate terminal of a respective one of the active peaking transistors of the active peaking transistor pair to a terminal of a respective other of the cross-coupled transistors of the respective active peaking transistor pair.

17. The continuous-time linear equalizer of claim 14, wherein a differential gain stage is formed for coupling a second input signal to a respective signal line of the differential signal lines for providing one of a predetermined or variable transconductance.

18. The continuous-time linear equalizer of claim 17, wherein the differential gain stage is formed as a telescopic stage.

19. The method of claim 14, wherein the continuous-time linear equalizer is further configured to couple a differential conversion unit, comprising regenerative cascaded transistor pairs, serially to the respective conversion transistors, with regenerative cascaded transistor pairs configured with transistors being cross-coupled with respect to the differential signal lines.

20. The continuous-time linear equalizer of claim 1, wherein the continuous-time linear equalizer is further configured to configure a setting unit to provide respective setting signals according to one of a predetermined setting or minimizing a bit error rate.

21. The continuous-time linear equalizer of claim 1, wherein a resistance of the active peaking resistor is chosen so that a frequency where a numerator of a transfer function of the continuous-time linear equalizer is zero is smaller than a frequency of the poles of a denominator of the transfer function.

* * * * *